United States Patent Office 3,632,615
Patented Jan. 4, 1972

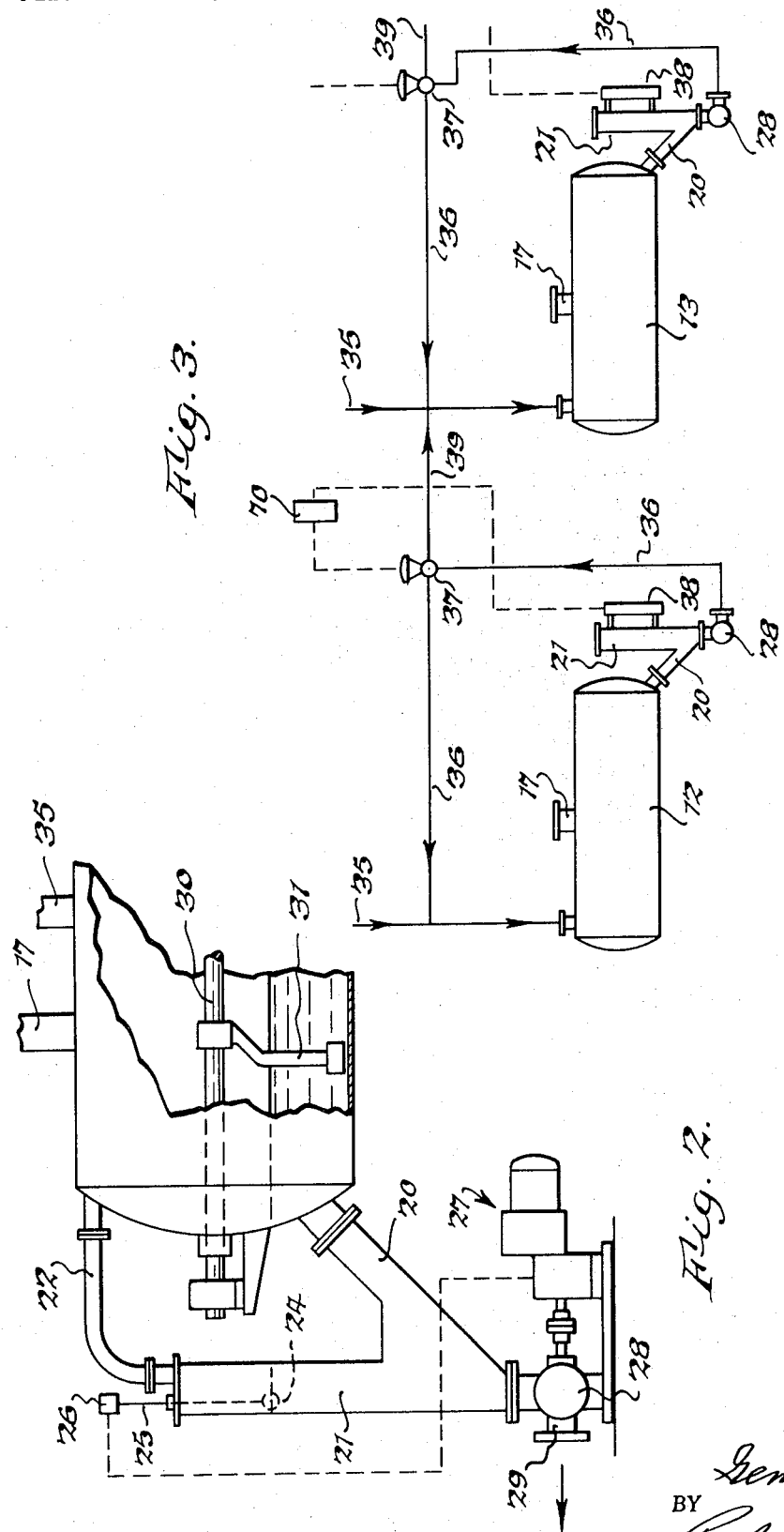

3,632,615
CONTINUOUS RENDERING OF FAT-CONTAINING MATERIAL
Gene C. Mason, Piqua, Ohio, assignor to The French Oil Mill Machinery Company, Piqua, Ohio
Filed Mar. 11, 1968, Ser. No. 712,265
Int. Cl. C11b 1/12
U.S. Cl. 260—412.6                     4 Claims

ABSTRACT OF THE DISCLOSURE

This process relates to continuous rendering of fat-containing material by passing the material in succession through a series of cookers in such a manner that the material can be pumped from one cooker to another by maintaining the material in fluid form and by maintaining the material in the cooker at a desired level. The cooked material is then passed through other apparatus and finally discharged in the form of liquid fat and solids including crackling cake. This replaces the batch cookers commonly used in rendering plants.

In the accompanying drawings:

FIG. 2 is a sectional view somewhat diagrammatic and on a larger scale showing a level control apparatus for use in connection with this process.

FIG. 3 is a view showing a part of the apparatus for carrying out my process.

Figure 1:
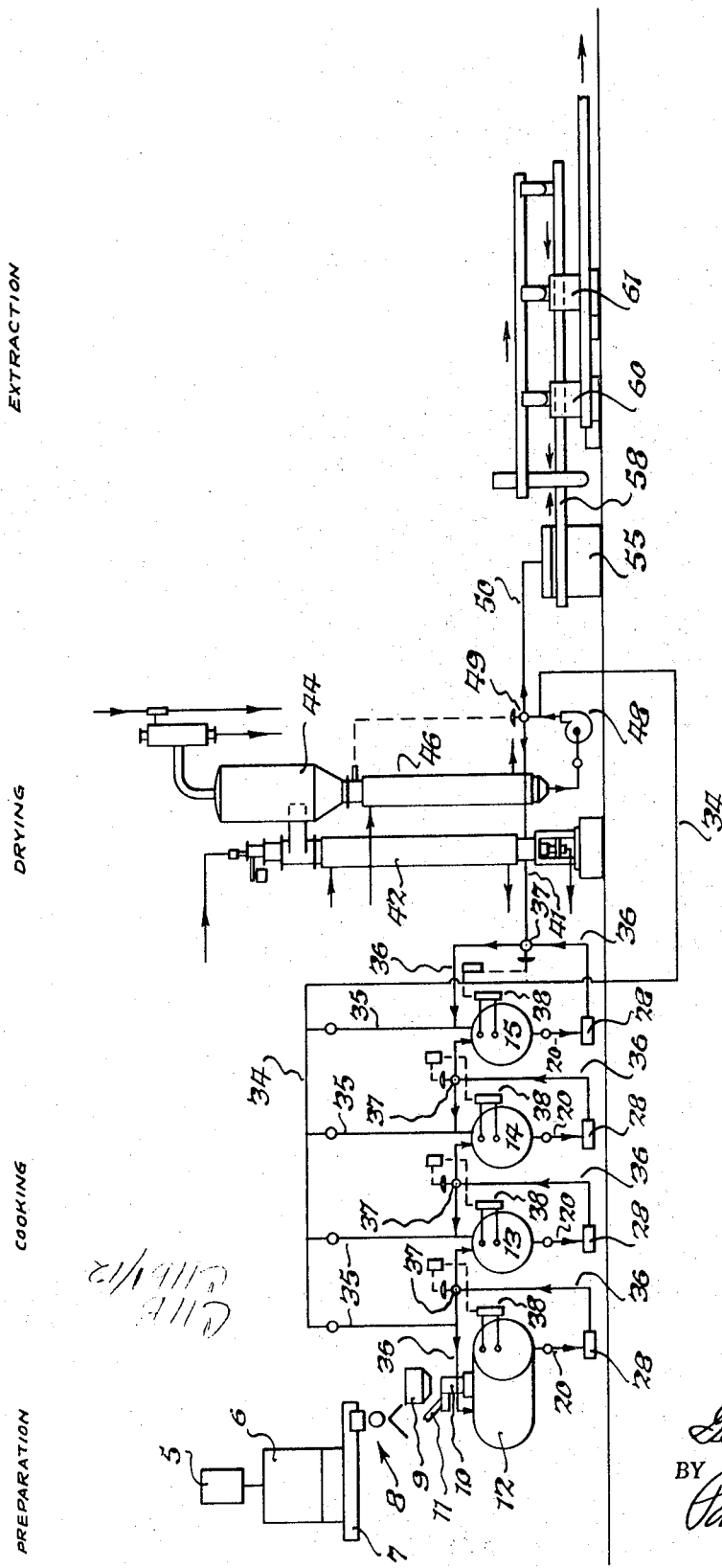
FIG. 1 is a diagrammatic view of the apparatus for carrying on the process embodying this invention.

In FIG. 1, 5 represents a rough or first stage grinder in which the material to be treated is reduced to particle sizes of approximately 1¼ to 1½ inches. The material may be shop scrap from butcher shops, hotels and restaurants, or it may be an insoluble product from packing houses which include large bones and rejected animals or even dead stock out of the fields.

This coarsely ground material is discharged into a surge or storage hopper 6 from which it may be fed at a uniform rate by means of a variable speed screw conveyor 7 to a magnetic separator 8 and then passes to a fine or second stage grinder 9. The material is then fed through a tube or duct 10 to a cooker 12, preferably to the far end thereof and the charging dome may be used as a vent. A vent pipe 11 may be provided or the charging duct 10 may be used as a vent. Additional cooker 13, 14 and 15 are provided, but it will be understood that the number of cookers may vary greatly and the material is fed successively from one cooker to the next. These cookers may be the same ones heretofore used in batch operations. In a batch type operation, when the cooking in any of the cookers is finished, which may take from 3 to 4 hours, the material is discharged into a receiver with a perforated bottom where the material drains and is then operated on by a mechanical press where the grease is pressed out of the product leaving a crackling cake. The grease and the crackling cake are the finished products and the material upon discharge from a cooker is handled manually.

In accordance with my process, various members which may be the same as those originally employed in the batch process, are directly connected in series and the material is fed from one cooker to another by means of pumps and piping. This cooking may be done under atmospheric conditions or under partial vacuum. Each of the cookers is provided with a vent 17, FIG. 3, through which vapor is discharged from the cookers and from which it may be passed through a condenser, not shown. The condensed liquid may be disposed in any suitable manner and may be discharged into the usual hot well.

An important feature of this treatment of the material in the cookers is that the quantity of material in each cooker is kept approximately constant. Any suitable level control may be provided for this purpose, such for example as the one shown in FIG. 2, in which the lower part of the cooker is connected with a branch 20 leading from the lower part of the cooker to an upright tube 21. The upper part of the cooker is connected to a vent pipe 22 leading to the upper end of the upright tube 21. It will be obvious that with these connections the level of the liquid in the upright tube 21 will be the same as that in the cooker. The level control includes a float 24 connected by means of an adjustable rod 25 to a suitable switch or electric contact device 26 which is connected with a motor 27, which through suitable gear reduction operates a pump 28 for discharging material from the cooker through a discharge duct 29 leading to the next cooker. Any other type of level control may be employed in place of the one herein described. Preferably each cooker has a rotary shaft 30 with paddles 31 by means of which the material being cooked is agitated.

In view of the fact that moisture is drawn off from the material in the cookers, the material becomes heavier and more difficult to pump. For this reason there is introduced into the cookers free tallow which may be a grease which has been pressed from the product treated in accordance with this process. This makes the product more fluid and easier to pump. This free tallow may be supplied to the cookers in any desired manner, for example, from a main pipe 34 to branch pipes 35 passing to the cookers. The branch pipes may be valve controlled so that the supply of the free tallow to each cooker may be controlled as required by an operator.

The means for heating the material in the cookers is not shown in the drawings since it may be the same as heretofore provided when the cookers were individually operated.

In referring to FIGS. 1 and 3, it will be noted that the material is discharged from cooker 12 to the pump 28 which passes it through an upwardly extending pipe 36 to a two-way valve 37 controlled by the level controller 38. This valve is controlled by a suitable valve-actuating device 70 controlled by the device 38 or it may be controlled manually. The valve 37 directs the material either to a pipe 39 leading to the cooker 13 when cooker 12 has a high level of material therein or back to the cooker 12 if the level in the cooker 12 is sufficiently low to require additional material. It is of course necessary to keep each cooker sufficiently filled with material to obtain the best results and to keep the material from getting burned or scorched. If material is discharged from the last cooker so that the level in the same drops, then material is supplied to it from the preceding cooker.

The valve 37 remains open for full recycle of the material when the apparatus is being started for filling the system or to make up for loss of raw material in the feed. This valve can be manually controlled by an operator.

The valve 37 is controlled by hand to bypass the level control during start-up or for recycle and is then controlled automatically by the level control 38 and actuating device 70, either for partial or full recycle, or for fully open position with no recycling.

The pump 28 is preferably operated continuously with variable speed control to keep the material moving continuously, which will keep the lines from plugging, although intermittent operation may be employed if desired. If the level of the material in cooker 12 is such as not to require recycling of the material, such material will be passed by the valve 37 into a pipe 39 leading to the next tank 13. The material must always pass in series through the cookers. It can recycle but must not bypass a cooker. A similar procedure is followed in connection with the other cookers until finally in the last cooker the material may be passed from the pump 28 to a valve 37 controlled by the level control in the last tank so that if the level in the last tank is sufficiently high so that material can be spared from the same, it may if desired be fed through a pipe 41 to a liquid-solids evaporator 42 which may be as described in my pending application No. 529,450 filed Feb. 23, 1966, and now Pat. 3,529,939, issued Sept. 22, 1970. This evaporator includes a cylindrical shell into the lower end of which the material to be treated is passed, and in this shell is a material-advancing device, such as a spiral screw, which is rotated in a direction to move the material upwardly in contact with the wall of the shell which is jacketed to permit the passage of a heating medium of the walls thereof. The heating medium in the jacketed wall may be steam or other heated fluid. If the material is sufficiently rendered in the last cooker of the series, the passage of the same through the liquid-solids evaporator may be dispensed with.

The material is discharged from the upper end of the evaporator unit 42 into the entrainment separator 44 and may then be passed downwardly through a recirculating leg 46 from which it may be introduced to a pump 48 which feeds the material through the piping controlled by a two-way valve 49 so that some or all of the material passes to the lower end of the evaporator unit 42 and another part of the material to a pipe 50 leading from the evaporator unit to an auto perc 55 which is a crackling receiver to which the material drains and from which much of the free grease is removed. This auto perc has a perforated member through which the free grease drains through the perforations and the solid material is discharged into a conveyor 58 which carries the material onto one or more presses 60 and 61 in which further grease is removed from the solid material. Any desired means may be provided for separating the grease from the crackling after the material has passed through the several cookers.

The process described has the advantage that the material being treated passes through all of the cookers without manual handling of the same at each cooker, as was heretofore necessary. By adding liquid grease to the cookers to replace water which has been evaporated, the entire mass of material can be passed through the process by pumping.

Cooking the material continuously as herein disclosed, ensures uniformity in the quality of the grease produced and of the cracklings for meat scrap meal.

It will be understood that various changes in the details, materials and arrangements of parts which have been herein described and illustrated in order to explain the nature of the invention may be made by those skilled in the art within the principle and scope of the invention as expressed in the appended claims.

I claim:

1. The continuous process of rendering finely divided animal material containing moisture, grease and solids in a series of directly interconnected cookers each having a vent, an inlet and an outlet, with the outlet of each cooker having a connection to its own inlet and, except for the last cooker, to the inlet of the next cooker, said process comprising: heating the material successively in the cookers to render the material and remove moisture therefrom through the vents, feeding the material successively to the first cooker and from the outlet of each cooker except the last, to the inlet of the next cooker, while maintaining an approximately constant quantity of the material in each cooker to prevent burning or scorching of the material by determining the level of the material in each cooker and by at least partially recycling the material to each cooker from its own outlet through its own inlet if the level in each cooker falls below that desired, and discharging the rendered material from the outlet of the last cooker for separating the grease and solids.

2. The continuous process of claim 1 wherein free grease is added as required to the cookers through their inlets to replace removed moisture and to make the material more fluid and easier to feed.

3. The continuous process of claim 1 wherein the material is kept moving continuously to prevent plugging of the connections between the cookers by continuously pumping the material from the outlet of each cooker.

4. The continuous process of claim 3 wherein free grease is added as required to the cookers through their inlets to replace removed moisture and to make the material more fluid and easier to feed.

References Cited

UNITED STATES PATENTS

| | | | |
|---|---|---|---|
| 3,057,699 | 10/1962 | Allbright et al. | 260—412.6 |
| 3,171,847 | 3/1965 | Aikins | 260—412.6 |
| 3,285,710 | 11/1966 | Corrigan | 260—412.6 |
| 3,307,916 | 3/1967 | Corrigan | 260—412.6 |
| 3,410,882 | 11/1968 | Macy et al. | 260—412.6 |

LEWIS GOTTS, Primary Examiner

J. R. BROWN, Assistant Examiner

U.S. Cl. X.R.

23—280